(12) United States Patent
Mueller et al.

(10) Patent No.: US 7,922,032 B2
(45) Date of Patent: Apr. 12, 2011

(54) CONCENTRATE CARTRIDGE FOR SPORT DRINK

(75) Inventors: Edward L. Mueller, Toledo, OH (US); Douglas F. Taylor, Toledo, OH (US)

(73) Assignee: iDispense, LLC, Toledo, OH (US)

( * ) Notice: Subject to any disclaimer, the term of this patent is extended or adjusted under 35 U.S.C. 154(b) by 0 days.

(21) Appl. No.: 11/815,051

(22) PCT Filed: Jul. 27, 2007

(86) PCT No.: PCT/US2007/074571
§ 371 (c)(1),
(2), (4) Date: Jul. 30, 2007

(87) PCT Pub. No.: WO2008/014444
PCT Pub. Date: Jan. 31, 2008

(65) Prior Publication Data
US 2009/0127274 A1    May 21, 2009

Related U.S. Application Data

(60) Provisional application No. 60/834,091, filed on Jul. 28, 2006.

(51) Int. Cl.
*B65D 39/08* (2006.01)
(52) U.S. Cl. ............................................ 220/789
(58) Field of Classification Search .............. 220/789, 220/303, 367.1, 254.1, 708, 705, 714, 713, 220/711, 203.29, 203.19, 203.01; 215/388, 215/387, 229, 228, 233, 356, 355; 222/129, 222/531, 526, 136, 135; D9/448, 449, 447, 435; 206/221, 219
See application file for complete search history.

(56) References Cited

U.S. PATENT DOCUMENTS

| | | | | |
|---|---|---|---|---|
| 3,024,947 A * | 3/1962 | Jeynes, Jr. | | 222/83.5 |
| 3,172,568 A * | 3/1965 | Modderno | | 222/80 |
| 3,966,089 A * | 6/1976 | Klingaman | | 222/88 |
| 4,239,132 A * | 12/1980 | Mueller et al. | | 222/212 |
| 4,448,316 A * | 5/1984 | Hiroshige | | 215/388 |
| 5,634,714 A * | 6/1997 | Guild | | 366/130 |
| 5,938,053 A * | 8/1999 | Verbovszky et al. | | 215/6 |
| 6,053,371 A * | 4/2000 | Durliat et al. | | 222/321.9 |
| 6,182,865 B1 * | 2/2001 | Bunschoten et al. | | 222/136 |
| 6,228,323 B1 * | 5/2001 | Asgharian et al. | | 422/28 |
| 6,279,773 B1 * | 8/2001 | Kiyota | | 220/709 |
| 6,290,100 B1 | 9/2001 | Yacko et al. | | |
| 6,364,163 B1 * | 4/2002 | Mueller | | 222/83 |
| 2004/0155061 A1 * | 8/2004 | Roth et al. | | 222/145.5 |
| 2005/0218104 A1 | 10/2005 | Cho | | |
| 2005/0224515 A1 | 10/2005 | Mon et al. | | |

* cited by examiner

*Primary Examiner* — Anthony Stashick
*Assistant Examiner* — Robert J Hicks
(74) *Attorney, Agent, or Firm* — Fraser Clemens Martin & Miller LLC; J. Douglas Miller

(57) ABSTRACT

A reusable concentrate cartridge and associated cap and valve for combining a concentrated material and a diluent in a diluting and dispensing container. The concentrate cartridge is provided with a hollow cylindrical body and a hollow tube with a closure. The concentrate cartridge is caused to open by the rotating engagement of a valve member, which causes a depending sleeve to urge the hollow tube within the concentrate cartridge to disengage and release the concentrate material into the diluent container.

10 Claims, 3 Drawing Sheets

CONCENTRATE CARTRIDGE FOR SPORT DRINK

CROSS-REFERENCE TO RELATED APPLICATION

This application claims the benefit of U.S. Provisional Patent Application Ser. No. 60/834,091 filed Jul. 28, 2006.

FIELD OF THE INVENTION

The invention relates to a cartridge and associated cap and valve for a diluting and dispensing container and more particularly to a concentrate cartridge for combining a sport drink concentrate with a liquid diluent.

BACKGROUND OF THE INVENTION

Representative of the most current and advanced state of the art is the concentrate cartridge illustrated and described in U.S. Pat. No. 6,290,100 entitled "Concentrate Cartridge for a Diluting and Dispensing Container" issued in the names of R. Bruce Yacko and Edward L. Mueller.

The combination of the cartridge and the dispensing container includes a hollow bottle for containing a liquid diluent having a neck portion for supporting a concentrate cartridge for containing a concentrate, wherein the cartridge comprises a hollow cylindrical element having a first open end forming a closure seat and a second end including a flange extending outwardly of the cylindrical element, an annular collar, and an annular web having a U-shaped cross-section interconnecting the collar and the flange of the first cylindrical element, and a hollow tube having a first end portion in fluid-tight sliding relation with the annular collar of the hollow cylindrical element, and a second end terminating in a radially outwardly extending closure adapted to selectively seat with the closure seat of the hollow cylindrical element to form a fluid-tight closure therebetween; and a closure cap including a dispensing means and means to mate with the neck portion of the hollow bottle to provide a tight seal.

It would be desirable to produce a concentrate cartridge capable of handling a concentrate for a sport drink for use with a diluting and dispensing container.

SUMMARY OF THE INVENTION

In concordance and agreement with the present invention a concentrate cartridge, capable of handling a concentrate for a sport drink for use with a diluting and dispensing container, has surprisingly been discovered.

In one embodiment, a concentrate cartridge comprises: a hollow main body having a first open end forming a closure seat and a spaced apart second end including a neck finish, a cap, an annular collar, and an annular web having a generally U-shaped cross-section interconnecting the collar and the finish; and a hollow tube having a first end portion in substantially fluid-tight sliding relation with the main body, and a second end portion including a radially outwardly extending closure adapted to selectively seat with the closure seat of the main body to form a substantially fluid-tight closure therebetween.

In another embodiment, a concentrate cartridge (body, cap, and valve) for a diluting and dispensing container comprises: a hollow main body having an inner surface, an outer surface, a first open end forming a closure seat and a spaced apart second end including a neck finish having threads formed on an outer surface thereof, an annular collar, an annular web having a generally U-shaped cross-section interconnecting the collar and the finish, and a cap having threads formed on an inner surface thereof adapted to engage the threads formed on the outer surface of the neck finish of a diluting and dispensing container, wherein an inner surface formed by the juncture of the annular collar and the annular web is inclined inwardly and upwardly from an inner surface of a hollow portion of the main body to the inner portion of the neck finish of the main body; a hollow tube having a first end portion in substantially fluid-tight sliding relation with the annular collar of the main body, and a second end portion including a radially outwardly extending closure adapted to selectively seat with the closure seat of the main body to form a substantially fluid-tight closure therebetween; a closure valve member including a hollow cylindrical skirt provided with threads formed on an inner surface thereof adapted to engage the threads of the neck finish of the main body, and a hollow cylindrical sleeve adapted to be received within the neck finish of the main body for engagement with the hollow tube, wherein a one-way valve forms the terminus of the hollow interior of the sleeve; and a means to militate against an undesired tightening of the closure valve member and release of a concentrated material into the diluting and dispensing container.

In another embodiment, a concentrate cartridge assembly comprising: a cartridge including a hollow main body having a first open end forming a closure seat and a spaced apart second end having a flange formed around the outer peripheral surface, and a hollow tube having a first end portion in substantially fluid-tight sliding relation with the main body, and a second end portion including a radially outwardly extending closure adapted to selectively seat with the closure seat of the main body to form a substantially fluid-tight closure therebetween; a closure valve member including a hollow cylindrical skirt provided with threads formed on an inner surface thereof adapted to engage the threads of the neck finish of the main body, and a hollow cylindrical sleeve adapted to be received within the neck finish of the main body, wherein a one-way valve forms the terminus of the hollow interior of the sleeve; and a means to couple the closure valve member to the cartridge including a neck finish having threads formed on an outer surface thereof, an annular collar, an annular web having a generally U-shaped cross-section interconnecting the collar and the neck finish, and a cap having threads formed on an inner surface thereof adapted to engage threads formed on an outer surface of a neck finish of a diluting and dispensing container.

BRIEF DESCRIPTION OF THE DRAWINGS

The above, as well as other, objects and advantages of the invention will become readily apparent to one skilled in the art from reading the following detailed description of the invention when considered in the light of the accompanying drawings, in which.

DETAILED DESCRIPTION OF THE PREFERRED EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner.

Figure 1:
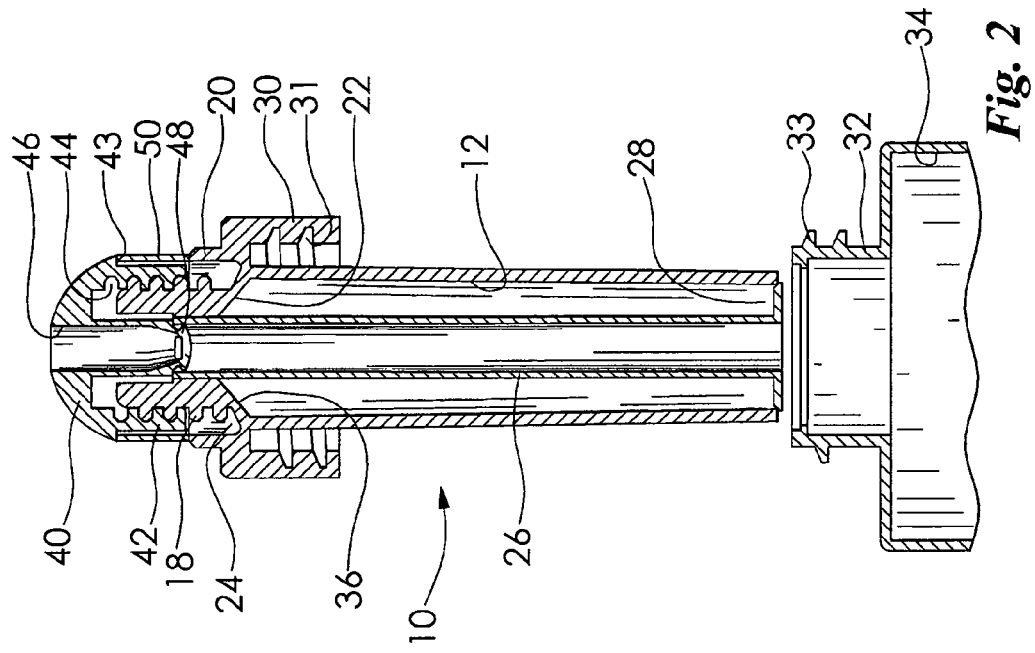
FIG. 1 is an exploded sectional view in section of a concentrate cartridge, cap, and valve incorporating the features of the present invention.
Figure 2:
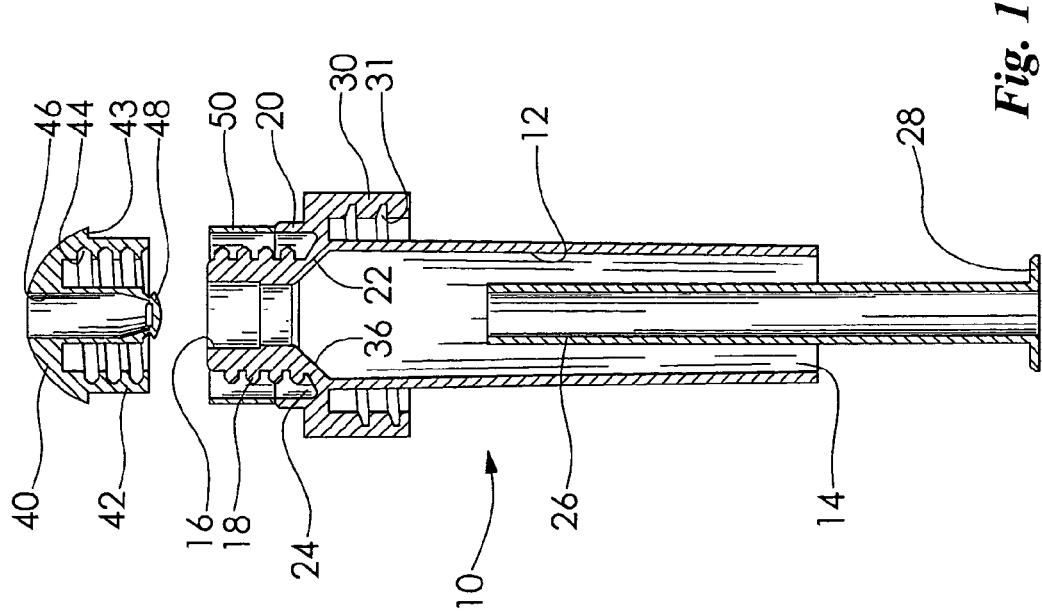
FIG. 2 is a fragmentary sectional view of the cartridge, cap, and valve, illustrated in FIG. 1, prepatory to insertion into an associated diluting and dispensing container.
Figure 3:
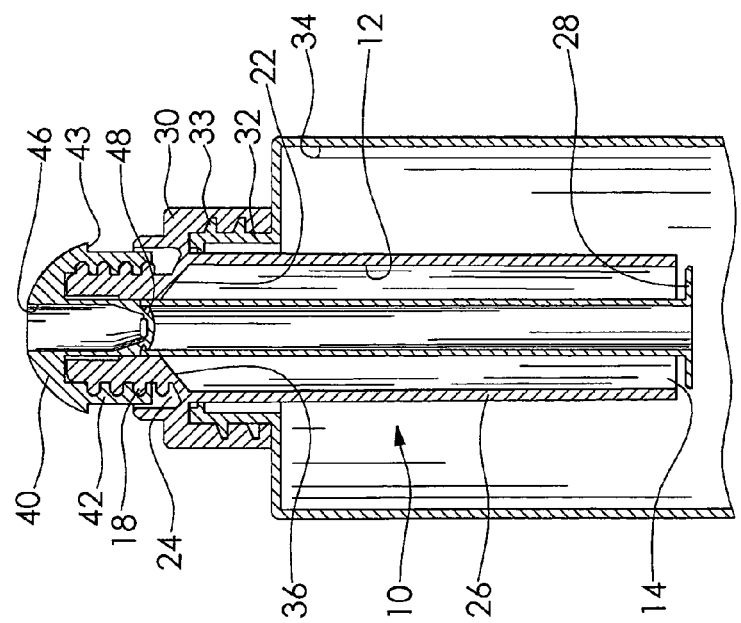
FIG. 3 is a fragmentary sectional view of the cartridge, cap, and valve, illustrated in FIGS. 1 and 2, inserted in and tightened on an associated diluting and dispensing container.

Referring to FIGS. 1 thru 3 of the drawings, there is illustrated a concentrate cartridge, generally indicated by reference numeral, 10 having a hollow cylindrical body 12. Although a substantially circular cross-sectional shape is shown, other cross-sectional shapes can be used for the cartridge 10, such as a rectangular cross-sectional shape, for example. In the preferred embodiment, the cartridge 10 is formed from a plastic material, such as polypropylene. It is understood that any suitable material can be used to produce the cartridge 10 as desired. The lower end 14 of the hollow cylindrical body 12 is open. The opposite end is provided with an upwardly extending neck finish 16 having threads 13 formed on the outer surface thereof.

An annular collar 20 is formed to surround in spaced relation the threaded portion of the neck finish 16. The lower end of the collar 20 is interconnected to an inner portion of the neck finish 16 by an annular web 22. It will be observed that the outer surface of the neck finish 16, the annular web 22, and the inner surface of the annular collar 20 form a trough 24 which is generally U-shaped in cross-section. The inner surface 36 formed by the juncture of the annular collar 20 and the annular web 22 is inclined inwardly and upwardly from the inner surface of the hollow cylindrical body 12 to the inner portion of the neck finish 16.

The cartridge 10 includes an associated closure member comprised of a hollow tube 26 having a radially outwardly extending closure 28 at one end thereof. The closure 28 is generally circular in plan view and is formed with a generally flat outer surface and an opposing inner surface. The periphery of the closure 28 is provided with an inclined camming surface.

The cartridge 10 is provided with a closure cap 30, having internally formed threads 31, which may be rotatingly coupled to the externally formed threads 33 of a neck finish 32 of an associated diluting and dispensing container 34, as illustrated in FIG. 3. The outer diameter of the cartridge 10 is slightly smaller than the inside diameter of the neck finish 32.

A closure valve member 40 is provided having a depending hollow cylindrical skirt 42. A flanged shoulder 43 is formed at the upper terminal end and internally threaded section 44 formed on the inner surface of the skirt 42. The threads 44 are adapted to engage the threads 18 of the neck finish 16.

A hollow cylindrical sleeve 46 depends from and is, typically, coaxial with the skirt 42. A one-way valve 48 is adapted to form the terminus of the hollow interior of the sleeve 46. The sleeve 46 is adapted to be slidingly received in fluid tight relation within the hollow interior of the neck finish 16. The one-way valve 48 typically contains a number of spaced apart apertures located at the terminal portion of the sleeve 46. When the closure 40 is in fully tightened position, as illustrated in FIG. 2, the apertures of the value 48 closed by being sealed against the inner surface of the tube 26. Thereby fluid flow through the tube 26 is prevented.

Normally, the cylindrical body 12 is filled with the desired drink concentrate and the closure 28 is in a closed sealed position against one end of the tube 26. The outer surface of the opposite end is in fluid-tight relation with the inner surface of finish 16. Thereby, the concentrate is suitably retained within the zone defined by the interior surface of body 12 and the exterior surface of the tube 26.

The cylindrical sleeve 46 of the closure member 40 is disposed in fluid-tight relation within the interior surface of the finish 16 with the valve 48 in fluid-tight relation with the adjacent end of the tube 26, thereby preventing the flow of any dilutant fluid within the container 34 through the sleeve 46. The above relation of components is accomplished by tightening the threads 44 of the closure cap 40 onto the threads 18 of the neck finish 16. Tightening of the closure cap 40 is limited by contact between the upper edge of a plastic seal 50 and the flange 43. The seal 50 is dimensioned such that when the outwardly extending flange 43 of the closure cap 40 makes contact with the upper edge of the seal 50, no further closing motion of the cap 40 is permitted. Thereby, the concentrate is properly maintained within the container as is clearly illustrated in FIG. 2.

It will be understood that the structure thus far discussed and illustrated in FIG. 2 will typically be sold by retailers. The retailers may initially offer to sell a container for water, for example, with a number of cartridges filled with the desired drink concentrate. Thereafter, the customer will only be required to purchase the concentrate cartridges to be utilized with the previously purchased container. This will reduce costs to the customer; will provide much needed shelf-space for the retailer; and materially reduce the amount of plastic containers delivered to the municipal refuse dumps.

In use, the assembly illustrated in FIG. 2 is placed in a container containing the amount of water to accept the quantity of concentrate contained in a single concentrate cartridge.

As illustrated in FIG. 3, the concentrate cartridge 10 has been placed in the container 34 after the safety seal 50 has been removed allowing for additional axial movement of the closure cap 40 to ultimately open the container 10 to allow the concentrate to be dispersed into the dillutant in the container 34. The procedure involves the following steps. The lower end 14 of the cartridge 10 is inserted into the neck finish 32 of the container 34. Ideally, the outer surface of the hollow cylindrical body 12 of the cartridge 10 is substantially smooth to facilitate positioning of the cartridge 10 within the neck finish 32 of the diluting and dispensing container 34.

When the cartridge 10 is fully inserted into the neck finish 32 of the container 34, the internal threads 31 of the closure cap 30 are mated with the external threads 33 of the neck finish 32. The closure cap 30 is tightened on the neck finish 32, causing a fluid-tight coupling between the cartridge 10 and the diluting and dispensing container 34 to be established.

Next, since the safety seal 50 has been removed, the closure valve member 40 is suitably tightened on the threads 18 formed on the neck finish 16 of the cartridge 10. This procedure causes the terminal end surface of the sleeve 46 to engage the upper end of the hollow tube 26 urging the hollow tube 26 downwardly within the hollow cylindrical body 12. As the tube 26 is moved downwardly, the closure 28 is caused to become unseated from the lower end 14 of the hollow cylindrical body 12 of the cartridge 10 and moved to an open position, as shown in FIG. 3. The concentrate within the cartridge 10 commences to flow from the cartridge 10 into the diluting and dispensing container 34 to effectively dilute the fluid within the container 10.

The diluted fluid may then be dispensed from the assembly by twisting the closure cap 40 to move the cap 40 upwardly to an untightened position to permit the flow of product mixture from the interior of the container 34, through to tube 26, and exit through the valve 48 and the sleeve 40. When the desired amount of drink mixture is dispensed, the cap 40 is tightened moving the valve 48 to a sealed position to block any flow of fluid therethrough.

It will be understood that the seal 50 normally militates against the tightening of the closure member 40 and thus prevents from the concentrate contained in the cartridge 10 from being released into the container 34. When it is desired to release the concentrate from the cartridge 10, the safety seal 50 may be removed by simply peeling the seal 50 therefrom and allowing the closure valve member 40 to be tightened to open the cartridge 10 as mentioned above.

Figure 4:
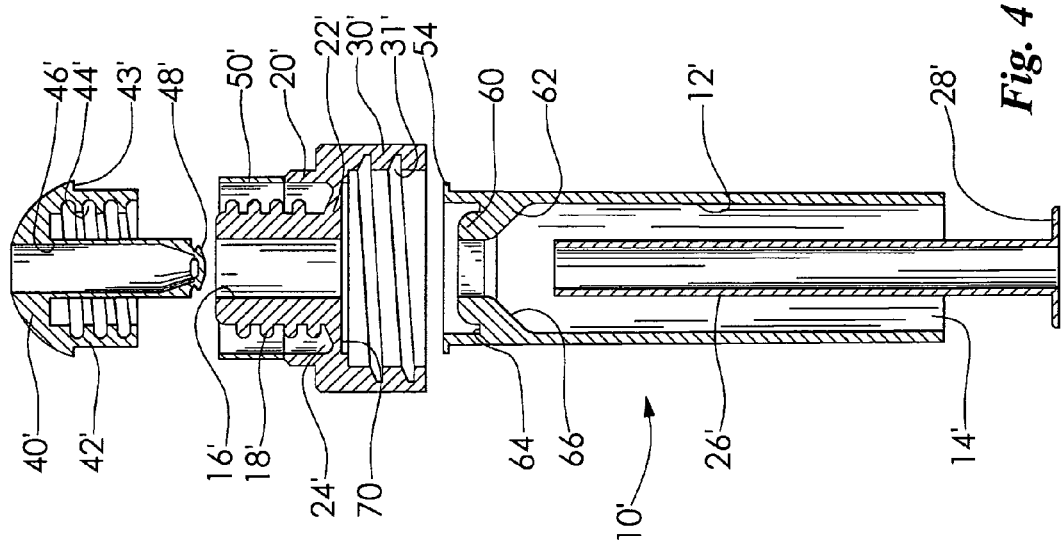
FIG. 4 is an exploded sectional view of a concentrate cartridge, cap, and valve according to an embodiment of the invention.
Figure 5:
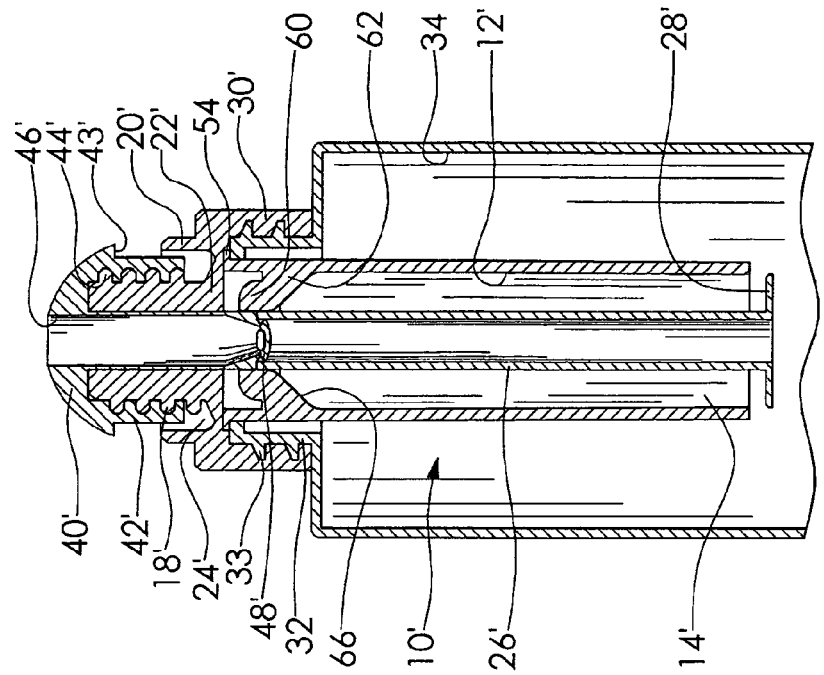
FIG. 5 is a sectional view of the cartridge, cap, and valve, illustrated in FIG. 4, preparatory to attachment of the valve.
Figure 6:
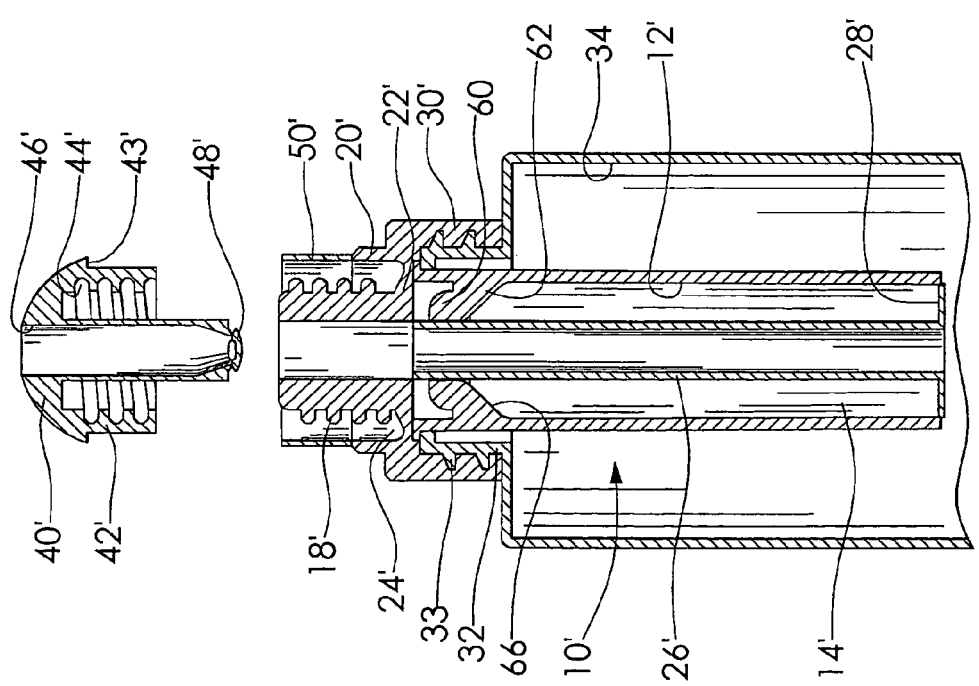
FIG. 6 is a fragmentary sectional view of the cartridge, cap, and valve, illustrated in FIGS. 4 and 5, inserted in and tightened on an associated diluting and dispensing container.

FIGS. 4 thru 6 depict a concentrate cartridge 10' according to another embodiment of the invention. Reference numerals for structural elements similar to those illustrated in FIGS. 1, 2, and 3 are designated with a prime (') symbol. Although a substantially circular cross-sectional shape is shown, other cross-sectional shapes can be used for the cartridge 10'. The cartridge 10' includes a hollow cylindrical body 12' formed from any suitable material, such as a plastic material, for example.

The lower end 14' of the hollow cylindrical body 12' is open. The opposite upper end of the body 12' is provided with an outwardly extending annular flange 54 and a recessed annular collar 60. The flange 54 extends completely around the outer peripheral surface of the hollow cylindrical body 12'. The juncture of an under surface of the flange 54 and an outer surface of the hollow cylindrical body 12' may be formed on a radius.

The flange 54 is adapted to rest on the upper open end of the neck finish 32' of an associated container 34' as illustrated in FIGS. 5 and 6.

The annular collar 60 is interconnected to the inner portion of the hollow cylindrical body 12' by an annular web 62. It will be observed that the inner surface of the upper portion of the hollow cylindrical body 12', the annular web 62, and the outer surface of the annular collar 60 form a trough 64 which is generally U-shaped in cross-section.

The inner surface 66 formed by the juncture of the annular collar 60 and the annular web 62 is inclined inwardly and upwardly from the inner surface of the hollow cylindrical body 12' to the inner surface of the annular collar 60.

The cartridge 10' includes an associated closure member comprised of a hollow tube 26' having a radially outwardly extending closure 28' at one end thereof. The closure 28' is formed with a generally flat outer surface and an opposing inner surface. The outer peripheral surface of the inner surface is provided with an inclined camming surface or bevel.

There is further provided a closure cap 30' with an upwardly extending neck finish 16' and an annular collar 20'. The closure cap 30', has internally formed threads 31', which may be rotatingly coupled to the externally formed threads 33' of a neck finish 32' of an associated diluting and dispensing container 34', as shown in FIGS. 5 and 6. The outer diameter of the cartridge 10' is slightly smaller then the inside diameter of the neck finish 32' of the diluting and dispensing container 34'.

The neck finish 16' includes threads 18' formed on the exterior surface thereof. An inner portion of the neck finish 16' is interconnected to the annular collar 20' by an annular web 22'. It will be observed that the outer surface of the neck finish 16', the annular web 22', and the inner surface of the annular collar 20' form a trough 24' which is generally U-shaped in cross-section. A recess 70 formed by the juncture of the annular collar 20' and the annular web 22' is substantially planar from the inner surface of the closure cap 30' to the inner portion of the neck finish 16'.

A closure valve member 40' is provided having a depending hollow cylindrical skirt 42'. The skirt 42' is further provided with threads 44' formed on the inner surface thereof. The threads 44' are adapted to engage the threads 18' of the neck finish 16'.

The closure valve member 40' includes a depending hollow cylindrical sleeve 46', typically coaxial with the skirt 42'. A one-way valve 48' is adapted to form the terminus of the hollow interior of the sleeve 46'. The sleeve 46' is formed to extend downwardly beyond the skirt 42' of the closure valve member 40' and to be slidingly received in fluid tight relation within the hollow interior of the neck finish 16'.

The assembly of the hollow cylindrical body 12' and the closure member is typically achieved by inserting the free end of the hollow tube 26' into the interior of the hollow cylindrical body 12' toward the open interior of the annular collar 60. This procedure is simplified by the existence of the inclined inner surface 66 which functions to readily guide the end of the hollow tube 26' into the annular collar 60. To effect a complete closure, the closure member is caused to move axially within the hollow cylindrical body 12' until the camming surface of the closure 28' cooperates with the lower end 14' of the hollow cylindrical body 12' to seal in a fluid-tight connection, as shown in FIG. 5. As a general rule, a concentrate material, such as a desired drink concentrate, for example, is inserted, manually or automatically, into the interior of the cartridge 10' before the closure member is closed to seal the concentrated material within the cartridge 10'.

Once filled with the desired drink concentrate, the lower end 14' of the cartridge 10' is inserted into the neck finish 32' of the diluting and dispensing container 34'. Ideally, the outer surface of the hollow cylindrical body 12' of the cartridge 10' is substantially smooth which facilitates sliding and positioning of the cartridge 10' within the neck finish 32' of the diluting and dispensing container 34'.

When the cartridge 10' is fully inserted into the neck finish 32', the flange 54 abuts the upper edge of the neck finish 32' to suspend the cartridge 10' within the container 34'. The neck finish 32' of the container 34' is inserted into the closure cap 30'. The internal threads 31' of the closure cap 30' are mated with the external threads 33' of the neck finish 32'. When the closure cap 30' is tightened on the neck finish 32', the flange 54 of the cartridge 10' seats within the recess 70 of the closure cap 30'. The under surface of the flange 54 is substantially flush with the upper surface of the inner portion of the closure cap 30', causing a fluid-tight coupling between the cartridge 10' and the diluting and dispensing container 34' to be established.

Next, the closure valve member 40' is suitably tightened on the threads 18' formed on the neck finish 16' of the cartridge 10'. This procedure is initiated by inserting the depending sleeve 46' into the hollow neck finish 16'. When the sleeve 46' is fully inserted, the closure valve member 40' is rotated causing the terminal end surface of the sleeve 46' to engage the upper end of the hollow tube 26' urging the hollow tube 26' downwardly within the hollow cylindrical body 12'. As the tube 26' is moved downwardly, the closure 28' is caused to disengage from the lower end 14' of the hollow cylindrical body 12' of the cartridge 10' to an open position, as shown in FIG. 6. Thus, allowing the concentrate within the cartridge 10' to flow from the cartridge 10' into the diluting and dispensing container 34'. The cartridge 10' may be refilled with concentrate and reused.

As a protective measure, a plastic safety seal 50' is applied to the opening portion of the neck finish 16'. The seal 50' will normally prevent the tightening of the closure valve member 40' and thus prevent the concentrate contained in the cartridge 10' from being released into the container 34'. When it is desired to release the concentrate, the safety seal 50' is removed by simply peeling the seal 50' therefrom and allowing the closure valve member 40' to be tightened to open the cartridge 10'.

The mixed product within the container 34' may then be allowed to flow therefrom and be selectively retained therein in the same manner as described in the earlier described embodiment.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A concentrate cartridge comprising:
   a hollow main body having a first open end forming a closure seat and a spaced apart second end including a neck finish including threads formed on an outer surface thereof, a closure cap having threads formed on an inner surface thereof adapted to engage threads formed on an outer surface of a neck finish of a diluting and dispensing container, an annular collar, and an annular web having a generally U-shaped cross-section interconnecting the collar and the neck finish of the hollow main body;
   a hollow tube having a first end portion in substantially fluid-tight sliding relation with the main body, and a second end portion including a radially outwardly extending closure adapted to selectively seat with the closure seat of the main body to form a substantially fluid-tight closure therebetween; and
   a closure valve member having a hollow cylindrical skirt provided with threads formed on an inner surface thereof adapted to engage the threads of the neck finish of the hollow main body, wherein the closure valve member includes a hollow cylindrical sleeve adapted to be received within the neck finish of the main body.

2. A concentrate cartridge body, cap, and valve for a diluting and dispensing container comprising:
   a hollow main body having a first open end forming a closure seat and a spaced apart second end including a neck finish having threads formed on an outer surface thereof, an annular collar, an annular web having a generally U-shaped cross-section interconnecting the collar and the finish, and a cap having threads formed on an inner surface thereof adapted to engage threads formed on an outer surface of a neck finish of a diluting and dispensing container, wherein an inner surface formed by the juncture of the annular collar and the annular web is inclined inwardly and upwardly from an inner surface of a hollow portion of the main body to an inner portion of the neck finish of the main body;
   a hollow tube having a first end portion in substantially fluid-tight sliding relation with the main body, and a second end portion including a radially outwardly extending closure adapted to selectively seat with the closure seat of the main body to form a substantially fluid-tight closure therebetween;
   a closure valve member including a hollow cylindrical skirt provided with threads formed on an inner surface thereof adapted to engage the threads of the neck finish of the main body, and a hollow cylindrical sleeve adapted to be received within the neck finish of the main body for engagement with the hollow tube, wherein a one-way valve forms the terminus of the hollow interior of the sleeve; and
   a means to militate against an undesired tightening of the closure valve member and release of a concentrated material into the diluting and dispensing container.

3. The concentrate cartridge body, cap, and valve for a diluting and dispensing container according to claim 2, wherein the means to prevent tightening of the closure valve member and release of the concentrated material into the diluting and dispensing container is a plastic safety seal.

4. The concentrate cartridge body, cap, and valve for a diluting and dispensing container according to claim 2, wherein the main body and hollow tube are produced from polypropylene.

5. A concentrate cartridge assembly comprising:
   a cartridge including a hollow main body having a first open end forming a closure seat and a spaced apart second end having a flange formed around the outer peripheral surface, and a hollow tube having a first end portion in substantially fluid-tight sliding relation with the main body, and a second end portion including a radially outwardly extending closure adapted to selectively seat with the closure seat of the main body to form a substantially fluid-tight closure therebetween;
   a means to couple including a neck finish having threads formed on an outer surface thereof, an annular collar, an annular web having a generally U-shaped cross-section interconnecting the collar and the neck finish of the means to couple, and a cap having threads formed on an inner surface thereof adapted to engage threads formed on an outer surface of a neck finish of a diluting and dispensing container; and
   a closure valve member including a hollow cylindrical skirt provided with threads formed on an inner surface thereof adapted to engage the threads of the neck finish of the means to couple, and a hollow cylindrical sleeve adapted to be received within the neck finish of the means to couple, a one-way valve forming a terminus of the hollow cylindrical sleeve, wherein the means to couple facilitates a coupling of the closure valve member to the cartridge.

6. The concentrate cartridge assembly according to claim 5, wherein a juncture of the annular collar and the annular web forms a recess adapted to receive the flange of the cartridge.

7. The concentrate cartridge assembly according to claim 5, wherein the cartridge is adapted to contain a concentrated material.

8. The concentrate cartridge assembly according to claim 7, wherein the second end of the main body further includes a means to prevent tightening of the closure valve member and release of the concentrated material into the diluting and dispensing container.

9. The concentrate cartridge assembly according to claim 8, wherein the means to prevent tightening of the closure valve member and release of the concentrated material into the diluting and dispensing container is a plastic safety seal.

10. The concentrate cartridge assembly according to claim 5, wherein the main body and the hollow tube are produced from polypropylene.

* * * * *